US007815787B2

United States Patent
Chen et al.

(10) Patent No.: US 7,815,787 B2
(45) Date of Patent: Oct. 19, 2010

(54) ELECTROLYTE RETAINING ON A ROTATING PLATEN BY DIRECTIONAL AIR FLOW

(75) Inventors: Hung Chih Chen, Santa Clara, CA (US); Rashid A. Mavliev, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 59 days.

(21) Appl. No.: 12/246,834

(22) Filed: Oct. 7, 2008

(65) Prior Publication Data

US 2009/0032408 A1  Feb. 5, 2009

Related U.S. Application Data

(62) Division of application No. 11/475,637, filed on Jun. 27, 2006, now abandoned.

(51) Int. Cl.
*B24B 1/00* (2006.01)
*B23H 5/08* (2006.01)

(52) U.S. Cl. .................. 205/663; 205/670; 205/671; 205/672; 451/28; 451/82

(58) Field of Classification Search .................. 205/663, 205/671–673; 451/28, 82
See application file for complete search history.

(56) References Cited

U.S. PATENT DOCUMENTS

| | | | |
|---|---|---|---|
| 4,450,652 A | 5/1984 | Walsh | |
| 4,471,579 A | 9/1984 | Bovensiepen | |
| 4,515,313 A | 5/1985 | Cavanagh | |
| 5,584,146 A | 12/1996 | Shamouillan et al. | |
| 5,643,050 A | 7/1997 | Chen | |
| 5,709,593 A | 1/1998 | Guthrie et al. | |
| 5,722,875 A | 3/1998 | Iwashita et al. | |
| 5,775,980 A | 7/1998 | Sasaki et al. | |
| 5,807,165 A | 9/1998 | Uzoh et al. | |
| 5,851,135 A | 12/1998 | Sandhu et al. | |
| 5,851,846 A | 12/1998 | Matsui et al. | |
| 5,957,750 A | 9/1999 | Brunelli | |

(Continued)

FOREIGN PATENT DOCUMENTS

KR     2004051150     6/2004

(Continued)

OTHER PUBLICATIONS

PCT Search Report, International Application No. PCT/US07/71705, dated Sep. 18, 2008.

(Continued)

*Primary Examiner*—Harry D. Wilkins, III
*Assistant Examiner*—Nicholas A. Smith
(74) *Attorney, Agent, or Firm*—Patterson & Sheridan, LLP

(57) ABSTRACT

A method and apparatus for retaining electrolyte on a rotating platen using directional air flow is provided. In one embodiment, an apparatus for processing a substrate is provided. The apparatus includes a platen assembly having a surface for supporting a processing pad and disposed on a stationary base so that the platen assembly may rotate relative to the base; and an air knife coupled to the base and extended over a portion of the surface, the air knife operable to deliver a stream of air toward the pad to divert at least a portion of a fluid disposed on the pad toward a center of the pad.

20 Claims, 4 Drawing Sheets

U.S. PATENT DOCUMENTS

| | | | |
|---|---|---|---|
| 6,000,997 | A | 12/1999 | Kao et al. |
| 6,012,967 | A | 1/2000 | Satake et al. |
| 6,056,794 | A | 5/2000 | Stoetzel et al. |
| 6,077,151 | A | 6/2000 | Black et al. |
| 6,165,053 | A | 12/2000 | Yokokawa et al. |
| 6,217,422 | B1 | 4/2001 | Franca et al. |
| 6,280,299 | B1 | 8/2001 | Kennedy et al. |
| 6,284,092 | B1 | 9/2001 | Manfredi |
| 6,319,098 | B1 | 11/2001 | Osterheld et al. |
| 6,358,124 | B1 | 3/2002 | Koga et al. |
| 6,582,487 | B2 | 6/2003 | Larson et al. |
| 6,612,422 | B2 | 9/2003 | Roberts et al. |
| 6,660,326 | B2 | 12/2003 | Sano et al. |
| 6,752,858 | B1 | 6/2004 | Flynn et al. |
| 6,878,629 | B1 | 4/2005 | Li et al. |
| 6,899,784 | B1 | 5/2005 | Li et al. |
| 6,910,951 | B2 | 6/2005 | Balijepalli et al. |
| 6,913,518 | B2 | 7/2005 | Chen et al. |
| 6,918,821 | B2 | 7/2005 | Balijepalli et al. |
| 6,964,602 | B2 | 11/2005 | Chopra et al. |
| 2002/0026752 | A1 | 3/2002 | Culler et al. |
| 2002/0068516 | A1 | 6/2002 | Chen et al. |
| 2003/0024170 | A1 | 2/2003 | Larson et al. |
| 2003/0036273 | A1 | 2/2003 | Donoso |
| 2003/0104769 | A1* | 6/2003 | Brunelli ................. 451/53 |
| 2003/0119427 | A1* | 6/2003 | Misra .................... 451/41 |
| 2005/0070212 | A1 | 3/2005 | Pham et al. |
| 2005/0126708 | A1 | 6/2005 | Chen et al. |
| 2005/0145507 | A1 | 7/2005 | Sun et al. |
| 2005/0186892 | A1 | 8/2005 | Chen et al. |
| 2006/0073768 | A1 | 4/2006 | Mavliev et al. |

FOREIGN PATENT DOCUMENTS

TW  567112  12/2003

OTHER PUBLICATIONS

Exair Corporation—Main Frame in Vortex Tube Page—Vortex Tubes, dated Oct. 6, 1998.

* cited by examiner

ELECTROLYTE RETAINING ON A ROTATING PLATEN BY DIRECTIONAL AIR FLOW

CROSS-REFERENCE TO RELATED APPLICATION

This application is a divisional of U.S. patent application Ser. No. 11/475,637 filed Jun. 27, 2006 now abandoned, which is incorporated herein by reference in its entirety.

BACKGROUND OF THE INVENTION

1. Field of the Invention

Embodiments of the present invention generally relate to electrochemical mechanical polishing. More particularly, embodiments of the present invention relate to a method and apparatus for retaining electrolyte on a rotating platen.

2. Description of the Related Art

Reliably producing sub-half micron and smaller features is one of the key technologies for the next generation of very large scale integration (VLSI) and ultra large-scale integration (ULSI) of semiconductor devices. However, as the limits of circuit technology are pushed, the shrinking dimensions of interconnects in VLSI and ULSI technology have placed additional demands on processing capabilities. Reliable formation of interconnects is important to VLSI and ULSI success and to the continued effort to increase circuit density and quality of individual substrates and dies.

Multilevel interconnects are formed using sequential material deposition and material removal techniques on a substrate surface to form features therein. As layers of materials are sequentially deposited and removed, the uppermost surface of the substrate may become non-planar across its surface and require planarization prior to further processing. Planarization or "polishing" is a process where material is removed from the surface of the substrate to form a generally even, planar surface. Planarization is useful in removing excess deposited material and removing undesired surface topography and surface defects, such as rough surfaces, agglomerated materials, crystal lattice damage, scratches, and contaminated layers or materials to provide an even surface for subsequent lithography and processing.

Electrochemical mechanical polishing (ECMP) is one method of planarizing a surface of a substrate. ECMP removes conductive materials from a substrate surface by electrochemical dissolution while polishing the substrate with a reduced mechanical abrasion compared to conventional chemical mechanical planarization (CMP) processes, which may require a high relative down force on a substrate to remove materials, such as copper, from the substrate. A typical ECMP system includes a substrate support and two electrodes disposed within an electrolyte containment basin. In operation, metal atoms on a surface of a substrate are ionized by an electrical current from a source of potential, such as a battery or other voltage source connected to the two electrodes. The metal ions dissolve into the surrounding electrolyte solution at a rate proportional to the electric current. The metal ions from the substrate (anode) plate the electrode (cathode), fall out of the solution as a precipitate of complexes, or remain in the solution. The density of the metal ions depends greatly on the chemistry of the metals and the solution.

ECMP processes require some amount of electrolyte solution to be maintained on a perforated processing pad surface to fill the perforations in order to conduct current between the electrodes. However, the rotational velocity of the pad causes centrifugal acceleration of the electrolyte on the pad surface which biases the electrolyte away from the center of the pad, thereby causing the electrolyte to drain from the pad.

The prior art contains different concepts addressing the draining problem, each having its own disadvantages, for example, a platen gutter which is height restricted by clearance between the polishing head and the platen, a platen cover which adversely affects the polishing process, and a flow directing wiper arm which contacts the pad surface, thereby adversely affecting the polishing process.

Therefore, there exists a need in the art for retaining electrolyte on a polishing pad surface without affecting the polishing process.

SUMMARY OF THE INVENTION

A method and apparatus for retaining electrolyte on a rotating platen using directional air flow is provided. In one embodiment, an apparatus for processing a substrate is provided. The apparatus includes a platen assembly having a surface for supporting a processing pad and disposed on a stationary base so that the platen assembly may rotate relative to the base; and an air knife coupled to the base and extended over a portion of the surface, the air knife operable to deliver a stream of air toward the pad to divert at least a portion of a fluid disposed on the pad toward a center of the pad.

In one embodiment, a first end of the air knife is disposed proximate an edge of the surface, a longitudinal axis of the air knife extends from the edge and toward the center of the surface, and the longitudinal axis of the air knife is inclined relative to a radial centerline, through the first end, of the surface by an angle. The angle may be greater than zero and less than or equal to forty-five degrees. In another aspect of the embodiment, a length of the air knife ranges from about one-fourth of a radius of the surface to about equal to the radius of the surface. In another aspect of the embodiment, the air knife includes an elongated plenum having a longitudinal opening configured to delver the stream of air toward the pad at a high velocity. In another aspect of the embodiment, the apparatus further comprising the pad disposed on the platen assembly and the fluid disposed on the pad, wherein the pad is made from an electrically conductive material and the fluid is an electrolyte.

In another embodiment, a method of processing a substrate is provided. The method includes the acts of providing a platen assembly, including a polishing pad disposed thereon and a fluid disposed on the polishing pad; providing an air knife disposed over the pad; rotating the platen assembly; and operating the air knife to deliver a stream of air toward the pad, wherein the stream of air will divert at least at least a portion of the fluid toward the center of the pad.

In another embodiment, a first end of the air knife is disposed proximate an edge of the pad, a longitudinal axis of the air knife extends from the edge and toward the center of the pad, and the longitudinal axis of the air knife is inclined relative to a radial centerline of the pad by an angle. The angle may be greater than zero and less than or equal to forty-five degrees. In another aspect of the embodiment, a length of the air knife ranges from about one-fourth of a radius of the pad to about equal to the radius of the pad. In another aspect of the embodiment, the method further includes disposing a substrate on the pad, wherein the substrate is polished by the pad. In another aspect of the embodiment, the air knife includes an elongated plenum having a longitudinal opening configured to delver the stream of air toward the pad at a high velocity. In another aspect of the embodiment, the pad is made from an electrically conductive material and the fluid is an electrolyte.

The method may further include disposing a substrate on the pad and establishing an electrical potential between the substrate and the pad, wherein the substrate is polished by the pad and the electrical potential. In another aspect of the embodiment, the stream of air will divert substantially all of the fluid toward the center of the pad.

In another embodiment, a method of processing a substrate includes rotating a platen assembly having a polishing pad disposed thereon, dispensing a polishing fluid onto the polishing pad, and directing a stream of air toward the polishing pad to divert at least at least a portion of the fluid toward the center of the pad.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

U.S. patent application Ser. No. 11/243,488, filed Oct. 4, 2005, entitled "Conductive Pad Design Modification for Better Wafer-Pad Contact" is hereby incorporated by reference in its entirety.

Figure 1:
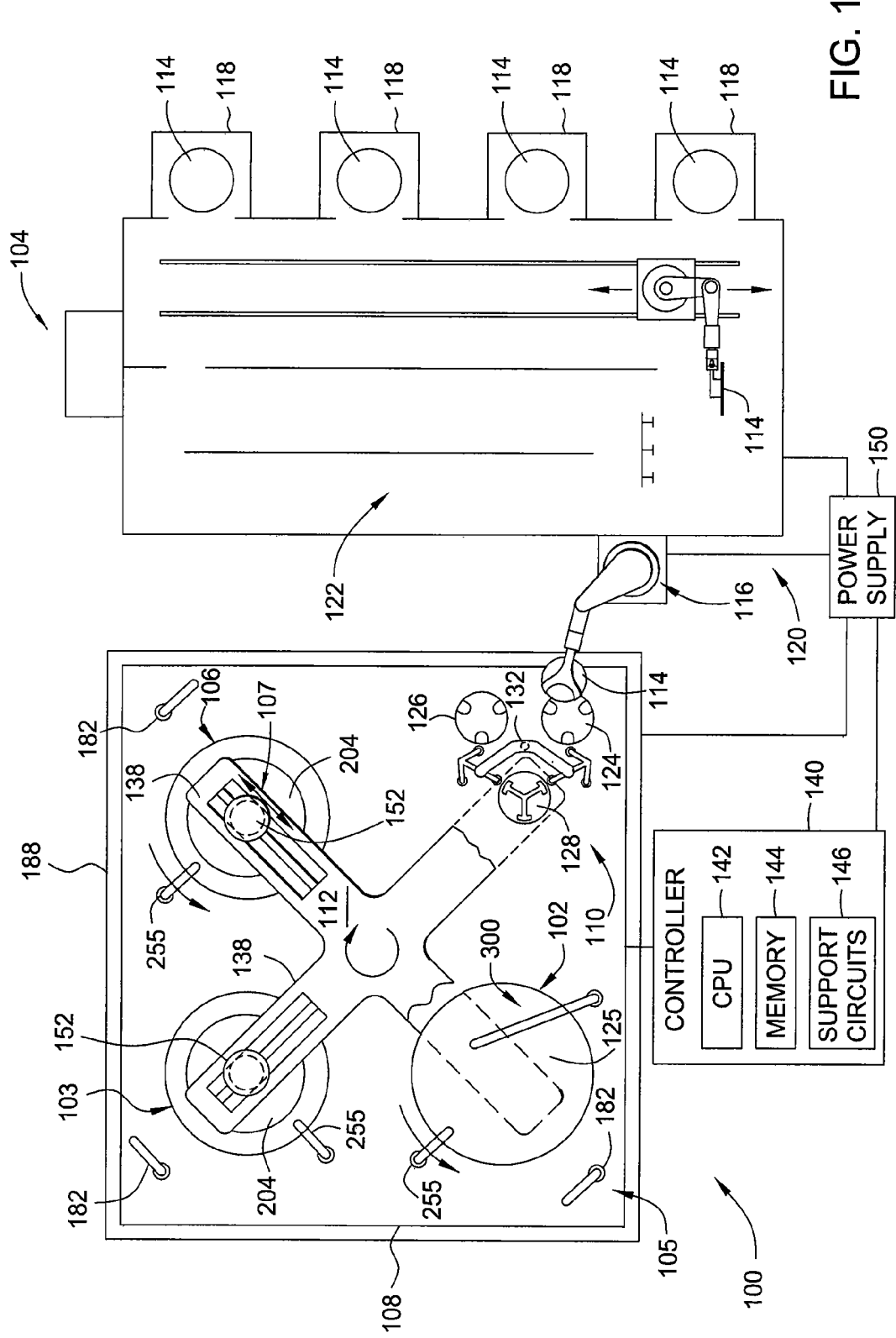
FIG. 1 is a plan view of an electrochemical mechanical planarizing system having an electrolyte-retaining air knife assembly, according to one embodiment of the present invention.

FIG. 1 depicts a processing apparatus 100 having an electrolyte-retaining air knife assembly 300 and a planarizing module 105 that is suitable for electrochemical mechanical polishing and chemical mechanical polishing, according to one embodiment of the present invention. The planarizing module 105 includes at least one electrochemical mechanical planarization (ECMP) station 102, and optionally, at least one conventional chemical mechanical planarization (CMP) station 106 disposed in an environmentally controlled enclosure 188. Examples of planarizing modules 105 that may be adapted to benefit from the invention include MIRRA®, MIRRA MESA™, REFLEXION®, REFLEXION LK®, REFLEXION LK Ecmp™ Chemical Mechanical Planarizing Systems, all available from Applied Materials, Inc. located in Santa Clara, Calif. Other planarizing modules commonly used in the art may also be adapted to benefit from the invention.

For example, in the planarizing module 105 shown in FIG. 1, the apparatus includes a first ECMP station 102, a second ECMP station 103, and one CMP station 106. The stations may be used for processing a substrate surface in three steps. For example, a substrate having feature definitions formed therein and filled with a barrier layer and then a conductive material disposed over the barrier layer may have the conductive material removed in two steps in the two ECMP stations 102, 103, with the barrier layer processed in the conventional CMP station 106 to form a planarized surface on the substrate. Alternatively, the CMP station 106 may be adapted to perform an ECMP process configured to remove the barrier material as well as any residual material. It is to be noted that either of the stations 102, 103, and 106 may also be adapted to deposit a material on a substrate by an electrochemical mechanical plating process (ECMPP), wherein the polarity of the bias provided to the pad is adjusted to deposit material on the substrate.

To facilitate the ECMP process, an electrolytic fluid may be provided to a nozzle 255 of the ECMP station 102. As discussed above, the rotational velocity of a platen assembly 230 (see FIG. 2) of the ECMP station 102 imparts centrifugal acceleration to the electrolyte which biases the electrolyte away from the center of the platen assembly 230, eventually draining the electrolyte from a pad assembly 222 (see FIG. 2) of the ECMP station 102. To counter this deleterious effect, an air knife assembly 300 is disposed on a base 108 over the platen assembly 230 of the ECMP station 102. The air knife assembly 300 is discussed in detail, below. Air knife assemblies may also be disposed over platen assemblies of the stations 103,106.

The exemplary apparatus 100 generally includes the base 108 that supports one or more ECMP stations 102, 103, one or more polishing stations 106, a transfer station 110, conditioning devices 182, and a carousel 112. The transfer station 110 generally facilitates transfer of substrates 114 to and from the apparatus 100 via a loading robot 116. The loading robot 116 typically transfers substrates 114 between the transfer station 110 and a factory interface 120 that may include a cleaning module 122, a metrology device 104 and one or more substrate storage cassettes 118.

Alternatively, the loading robot 116 (or factory interface 120) may transfer substrates to one or more other processing tools (not shown) such as a chemical vapor deposition tool, physical vapor deposition tool, etch tool and the like.

In this exemplary embodiment, the transfer station 110 comprises at least an input buffer station 124, an output buffer station 126, a transfer robot 132, and a load cup assembly 128. The loading robot 116 places the substrate 114 onto the input buffer station 124. The transfer robot 132 has two gripper assemblies, each having pneumatic gripper fingers that hold the substrate 114 by the substrate's edge. The transfer robot 132 lifts the substrate 114 from the input buffer station 124 and rotates the gripper and substrate 114 to position the substrate 114 over the load cup assembly 128, then places the substrate 114 down onto the load cup assembly 128. An example of a transfer station that may be used is described in U.S. Pat. No. 6,156,124, which issued Dec. 5, 2000, entitled "Wafer Transfer Station for a Chemical Mechanical Polisher," which is incorporated herein by reference to the extent it is not inconsistent with this disclosure.

The carousel 112 generally supports a plurality of planarizing or carrier heads 204, each of which retains one substrate 114 during processing. The carousel 112 articulates the carrier heads 204 between the transfer station 110, the one or more ECMP stations 102, 103 and the one or more polishing stations 106. One carousel that may be adapted to benefit from the invention is generally described in U.S. Pat. No. 5,804,507, issued Sep. 8, 1998, entitled "Radially Oscillating Carousel Processing System for Chemical Mechanical Polishing," which is hereby incorporated by reference to the extent the application is not inconsistent with this disclosure.

Generally, the carousel 112 is centrally disposed on the base 108. The carousel 112 typically includes a plurality of arms 138. Each arm 138 generally supports one of the planarizing or carrier heads 204. Two of the arms 138 depicted in FIG. 1 are shown in phantom so that the transfer station 110 and the planarizing surface 125 of ECMP station 102 may be seen. The carousel 112 is indexable such that the carrier head 204 may be moved between the stations 102, 103, 106 and the transfer station 110 in a sequence defined by the user.

Generally the carrier head 204 retains the substrate 114 while the substrate 114 is disposed in the ECMP stations 102, 103 or polishing station 106. The arrangement of the ECMP stations 102, 103 and polishing stations 106 on the apparatus 100 allow for the substrate 114 to be sequentially processed by moving the substrate between stations while being retained in the same carrier head 204.

To facilitate control of the polishing apparatus 100 and processes performed thereon, a controller 140 comprising a central processing unit (CPU) 142, memory 144, and support circuits 146, is connected to the polishing apparatus 100. The CPU 142 may be one of any form of computer processor that can be used in an industrial setting for controlling various drives and pressures. The memory 144 is connected to the CPU 142. The memory 144, or computer-readable medium, may be one or more of readily available memory such as random access memory (RAM), read only memory (ROM), floppy disk, hard disk, or any other form of digital storage, local or remote. The support circuits 146 are connected to the CPU 142 for supporting the processor in a conventional manner. These circuits include cache, power supplies, clock circuits, input/output circuitry, subsystems, and the like.

Power to operate the polishing apparatus 100 and/or the controller 140 is provided by a power supply 150. Illustratively, the power supply 150 is shown connected to multiple components of the processing apparatus 100, including the transfer station 110, the factory interface 120, the loading robot 116 and the controller 140. In other embodiments separate power supplies are provided for two or more components of the polishing apparatus 100.

Figure 2:
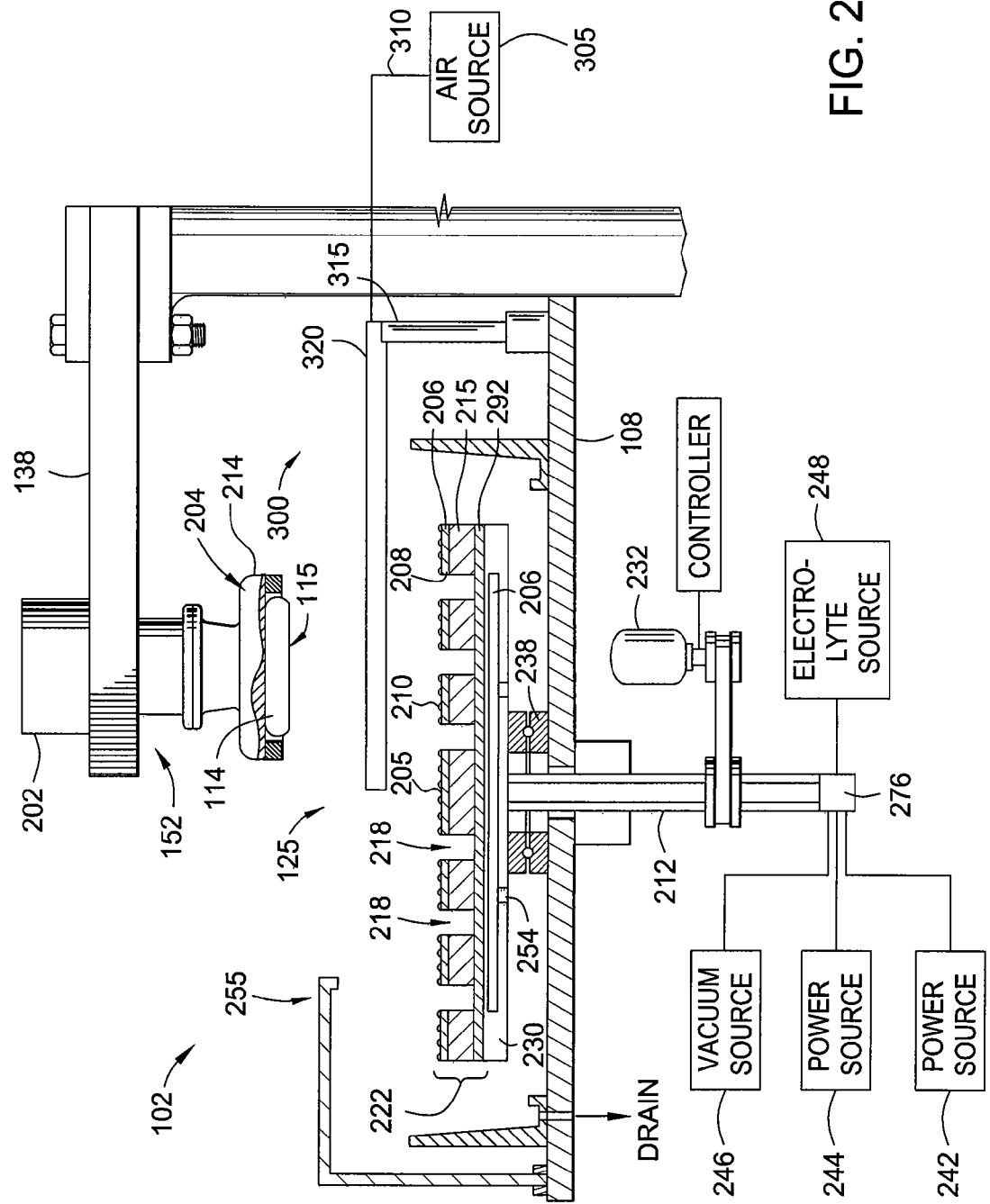
FIG. 2 is a sectional view of one embodiment of a first electrochemical mechanical planarizing (ECMP) station of the system of FIG. 1.

FIG. 2 depicts a sectional view of one of the planarizing head assemblies 152 positioned over one embodiment of ECMP station 102. The planarizing head assembly 152 generally comprises a drive system 202 coupled to a carrier head 204. The drive system 202 generally provides at least rotational motion to the carrier head 204. The carrier head 204 additionally may be actuated toward the ECMP station 102 such that the substrate 114, retained in the carrier head 204, may be disposed against a contact surface 125 of the ECMP station 102 during processing. The head assembly 152 may also translate movement in a path indicated by arrow 107 in FIG. 1 during processing. The drive system 202 is coupled to the controller 140 (in FIG. 1) that provides a signal to the drive system 202 for controlling the rotational speed and direction of the carrier head 204.

In one embodiment, the carrier head 204 may be a TITAN HEAD™ or TITAN PROFILER™ wafer carrier manufactured by Applied Materials, Inc. Generally, the carrier head 204 comprises a housing 214 and a retaining ring that defines a center recess in which the substrate 114 is retained. The retaining ring may circumscribe the substrate 114 disposed within the carrier head 204 to prevent the substrate 114 from slipping out from under the carrier head 204 during processing. The retaining ring can be made of plastic materials such as PPS, PEEK, and the like, or conductive materials such as stainless steel, Cu, Au, Pd, and the like, or some combination thereof. It is further contemplated that a conductive retaining ring may be electrically biased to control the electric field during the ECMP process or an electrochemical plating process. It is also contemplated that other planarizing or carrier heads may be utilized.

The ECMP station 102 generally includes a platen assembly 230 that is rotationally disposed on the base 108. The platen assembly 230 is supported above the base 108 by a bearing 238 so that the platen assembly 230 may be rotated relative to the base 108. An area of the base 108 circumscribed by the bearing 238 is open and provides a conduit for the electrical, mechanical, pneumatic, control signals and connections communicating with the platen assembly 230.

The ECMP station 102 includes a pad assembly 222 coupled to an upper surface of the platen assembly 230. The pad assembly 222 depicted in FIG. 2 includes a first conductive layer, such as a contact layer 208 comprising the upper surface of the pad assembly 222, an article support layer or subpad 215, and a second conductive layer, such as the electrode 292. In one embodiment, the contact layer 208 has a contact surface 125 that is adapted to contact the feature side 115 of the substrate 114 during processing. In another embodiment, the contact layer 208 may be further coated with a metallic coating that is adapted to at least partially contact the feature side 115 of the substrate 114. In another embodiment, the contact layer 208 is adapted to contact the feature side 115 of the substrate 114 and the contact layer 208 may be at least partially coated with the metallic coating and a portion of the contact layer 208 is exposed. In another embodiment, the contact layer 208 may be at least partially coated with the metallic coating and at least a portion of the coating is adapted to be consumed by the process to expose at least a portion of the contact layer 208. Alternatively or additionally, at least one or both of the contact layer 208 and the metallic coating may comprise abrasive particles (not shown in this view). The abrasive particles comprise ceramics, cured polymers, process resistant metals, oxides thereof and combinations thereof. In one embodiment, the abrasive particles are chosen to exhibit a hardness less than or equal to copper, to exhibit a hardness greater than copper, or a plurality of abrasive particles having a combination of differing hardnesses thereof. In one embodiment, the abrasive particles range in size from about 0.2 microns to about 1.0 microns.

Conventional bearings, rotary unions and slip rings, collectively referred to as rotary coupler 276, are provided such that electrical, mechanical, fluid, pneumatic, control signals and connections may be coupled between the base 108 and the rotating platen assembly 230 through a hollow drive shaft 212. The ECMP station 102 may also be coupled to a vacuum source 246 that provides a low partial pressure to the platen assembly 230 or other parts of the ECMP station 102. The platen assembly 230 is typically coupled to a motor 232 that provides the rotational motion to the platen assembly 230. The motor 232 is coupled to the controller 140 that provides a signal for controlling for the rotational speed and direction of the platen assembly 230. The platen assembly 230 is generally fabricated from a rigid material, such as aluminum, and has an upper surface that may be fabricated from the same material, or a rigid plastic. In one embodiment, the upper surface is fabricated from or coated with a dielectric material, such as CPVC. The upper surface may have a circular, rectangular or other plane form and is adapted to support a processing pad assembly 222 thereon.

Optionally, a magnetic element 254 may be disposed within the platen assembly 230 and is adapted to urge the processing pad assembly 222 toward the platen assembly 230. The magnetic element 254 is coupled to a power source 244 through the rotary coupler 276 and the magnetic element 254 is magnetically coupled to metallic material disposed in, on, or coupled to the processing pad assembly 222. It is contemplated that the magnetic element 254 may be coupled to the pad assembly 222 such that the pad assembly 222 is attracted to the platen assembly 230. The magnetic attraction between the magnetic element 254 and processing pad assembly 222 pulls the processing pad assembly 222 against the upper surface of the platen assembly 230 such that the processing pad assembly 222 advantageously remains stationary relative to the platen assembly 230 during processing. Uses of magnetic elements to couple a processing pad assembly are disclosed in United States Patent Publication No. 2005/0000801 (APPM/004100.P11), filed Jun. 30, 2004, entitled "Method and Apparatus for Electrochemical Mechanical Processing," and incorporated herein by reference to the extent it is not inconsistent with this disclosure. It is also contemplated that the pad assembly 222 may be coupled to the upper surface of the platen assembly 230 by other means, such as adhesives and/or binders, or vacuum ports, and may not use a magnetic element.

The electrolytic fluid may be provided from an electrolyte source 248, through appropriate plumbing and controls to nozzle 255 above the process pad assembly 222 on planarizing module 102. Optionally, a plenum 206 may be defined in the platen assembly 230 to supply an electrolyte to the pad assembly 222. The pad assembly 222 may have a plurality of holes (not shown) formed therethrough in communication with the plenum 206. A detailed description of an exemplary planarizing assembly that may be used can be found in the description of FIG. 2 in United States Patent Publication No. 2004/0163946 (APPM/004100.P10), filed Dec. 23, 2003, entitled "Pad Assembly for Electrochemical Mechanical Processing," incorporated herein by reference to the extent the application is not inconsistent with this disclosure.

The electrode 292 is typically made of a conductive material, such as stainless steel, copper, aluminum, gold, silver and tungsten, among others. The electrode 292 can be a plate-like member or laminate, a plate having multiple apertures formed therethrough, or a plurality of electrode pieces disposed in a permeable membrane or container. For example, the electrode 292 may be a metal foil, a mesh made of metal wire or metal-coated wire, or a laminated metal layer on a polymer film compatible with the electrolyte, such as a polyimide, polyester, flouroethylene, polypropylene, or polyethylene sheet. The electrode 292 may act as a single electrode, or may comprise multiple independent electrode zones isolated from each other. Zoned electrodes are discussed in United States Patent Publication No. 2004/0082289 (APPM/004100.P8), filed Aug. 15, 2003, entitled "Conductive Polishing Article for Electrochemical Mechanical Polishing," which is hereby incorporated by reference to the extent it is not inconsistent with this disclosure. The electrode 292 may be solid, impermeable to electrolyte, permeable to electrolyte or perforated, or combinations thereof. In the embodiment depicted in FIG. 2, the electrode 292 is solid, but may be perforated and configured to allow electrolyte therethrough. The electrode 292 is disposed on the upper surface of the platen assembly 230 and is coupled to the power source 242 through the platen assembly 230. Electrical connections from the electrode 292 and/or the platen assembly 230 may be routed through a hollow drive shaft 212 to provide electrical communication from the electrode 292 to at least one of the power sources 242 or 244.

The electrode 292, subpad 215, and contact layer 208 of the pad assembly 222 may be combined into a unitary assembly by the use of binders, adhesives, bonding, compression molding, or the like. In one embodiment, adhesive is used to attach the electrode 292, subpad 215, and contact layer 208 together. The adhesive generally is a pressure sensitive adhesive or a temperature sensitive adhesive and should be compatible with the process chemistry as well as with the different materials used for the electrode 292, subpad 215, and/or the contact layer 208. The adhesive may have a strong physical and/or chemical bond to the electrode 292, subpad 215, and the contact layer 208. However, selection of the adhesive may also depend upon the form of the electrode 292, subpad 215, and the contact layer 208. The adhesive bonding between the electrode 292, subpad 215, and the contact layer 208 may be increased by the surface morphology of the materials selected to form the pad assembly 222 (i.e., fabrics, screens, and perforations versus solids). For example, if the electrode 292 is fabricated from a screen, mesh, or perforated foil, a weaker adhesive may be selected due to the increased surface area of the electrode 292. It is also contemplated that stainless steel hook and loop or a stainless steel Velcro® connection may be used as the binder between the electrode 292 and the subpad 215 and/or the electrode 292 and the platen assembly 230. The pad assembly 222 is disposed on the upper surface of the platen assembly 230 and may be held there by magnetic attraction, static attraction, vacuum, adhesives, or the like. In one embodiment, adhesive is used to bind the electrode 292 of the pad assembly 222 to the upper surface of the platen assembly 230.

The contact layer 208 may be fabricated from polymeric materials compatible with the process chemistry, examples of which include polyurethane, polycarbonate, fluoropolymers, PTFE, PTFA, polyphenylene sulfide (PPS), or combinations thereof, and other polishing materials used in polishing substrate surfaces. The polymeric materials may be dielectric or, alternatively, conductive. The contact layer 208 may be smooth or patterned to facilitate distribution of the electrolyte over the surface of the pad assembly 222. Patterns may include posts, grooves, cutouts, perforations, channels or other contours in the surface. In one embodiment, the contact layer 208 comprises a plurality of abrasive particles in a polymer matrix, embossed or compression molded to form a plurality of posts 210 spaced apart by a plurality of interstitial areas 205. The posts 210 are arranged in a pattern on the contact layer 208 and may comprise shapes such as rectangles, ovals, circles, or combinations thereof, in any suitable pattern. The pad assembly 222 may further include perforations at least to the electrode 292.

In the case of a rectangular post, any one side may comprise a length from about 170 microns to about 250 microns in one embodiment. In another embodiment, the length of any one side of a rectangular post is greater than 250 microns, such as about 250 microns to about 2 mm. In yet another embodiment, the length of any one side of a rectangular post is between about 2 mm to about 4 mm. In the case of a circular post, the diameter is between about 170 microns to about 250 microns in one embodiment. In another embodiment, the diameter is greater than 250 microns, such as about 250 microns to about 2 mm. In yet another embodiment, the diameter is greater than 2 mm, such as about 2 mm to about 4 mm. The height of the posts 210 may range in size between about 30 microns to about 60 microns in one embodiment. In another embodiment, the height is greater than about 60 microns, such as about 60 microns to about 1 mm. In yet another embodiment, the height may be a suitable height up to and including about 4 mm.

In another embodiment, the pad assembly 222 may include conductive contact elements (not shown) adapted to extend above the contact layer 208. Examples of contact elements that may be used in the pad assembly 222 are described in United States Patent Publication No. 2002/0119286 (APPM/004100.P1), filed Dec. 27, 2001, entitled "Conductive Polishing Article for Electrochemical Mechanical Polishing," which is incorporated by reference herein to the extent the application is not inconsistent with this disclosure. A detailed description of a process pad assembly and counterparts that may be used can be found in United States Patent Publication No. 2004/0163946 (APPM/004100.P10), entitled "Pad Assembly for Electrochemical Mechanical Processing," which was previously incorporated by reference. Examples of conductive contact elements that may be found in the descriptions of FIGS. 3-13 in United States Patent Publication No. 2005/0000801 (APPM/004100.P11), filed Jun. 30, 2004, entitled "Method and Apparatus for Electrochemical Mechanical Processing," which was previously incorporated by reference.

The subpad 215 is typically made of a material softer, or more compliant, than the material of the contact layer 208. The difference in hardness or modulus of elasticity between the contact layer 208 and the subpad 215 may be chosen to produce a desired polishing performance. The subpad 215 may also be compressible. Examples of suitable subpad 215 materials include, but are not limited to, open or closed-cell foamed polymer, elastomers, felt, urethane impregnated felt, plastics, and like materials compatible with the processing chemistries. The contact layer 208 is harder and less compliant than the subpad 215 so the posts 210 balance a suitable force distribution for maintaining sufficient contact with the substrate 114.

The plurality of perforations 218 may be formed in a rectangular pattern, a triangular pattern, or any other uniformly distributed pattern and generally has a percent open area of from about 10% to about 90% (i.e., the area of the holes open to the electrode as a percentage of the total surface area of the polishing layer). The plurality of perforations 218 may be molded in the pad assembly 222 as formed, or the perforations 218 may be formed by, for example, a steel rule die, an ultrasonic knife/punch, or a male/female die punch, among other forming methods. The application or process steps for coating and forming may be determined by the pre-coating topography of the contact layer 208, or the resulting topography desired on the contact layer 208. The perforations 218 may take any shape, such as circles, ovals, squares, rectangles, or combinations thereof. Care should be taken in perforating the pad assembly 222 as any irregularities in the contact surface 125 of the contact layer 208 may cause damage to the substrate 114. The location and open area percentage of the perforations 218 in the pad assembly 222 controls the quantity and distribution of electrolyte contacting the electrode 292 and substrate 114 during processing, thereby controlling the rate of removal of material from the feature side 115 of the substrate 114 in a polishing operation, or the rate of deposition in a plating operation.

As discussed above, the rotational velocity of the platen assembly 230 imparts centrifugal acceleration to the electrolyte which biases the electrolyte away from the center of the platen assembly 230, eventually draining the electrolyte from the pad assembly 222. To counter this deleterious effect, the air knife assembly 300 is disposed on the base 108. The air knife assembly 300 includes a support structure 315, a source of compressed air 305, an air knife 320, and an air supply line 310 which provides communication between an inlet of the air knife 320 and an outlet of the air source 305. The air knife 320 is disposed proximate to an upper surface of the pad 222 to deliver a high velocity stream of air to the upper surface of the pad 222. This stream of air serves as a barrier to the electrolyte.

Figure 3:
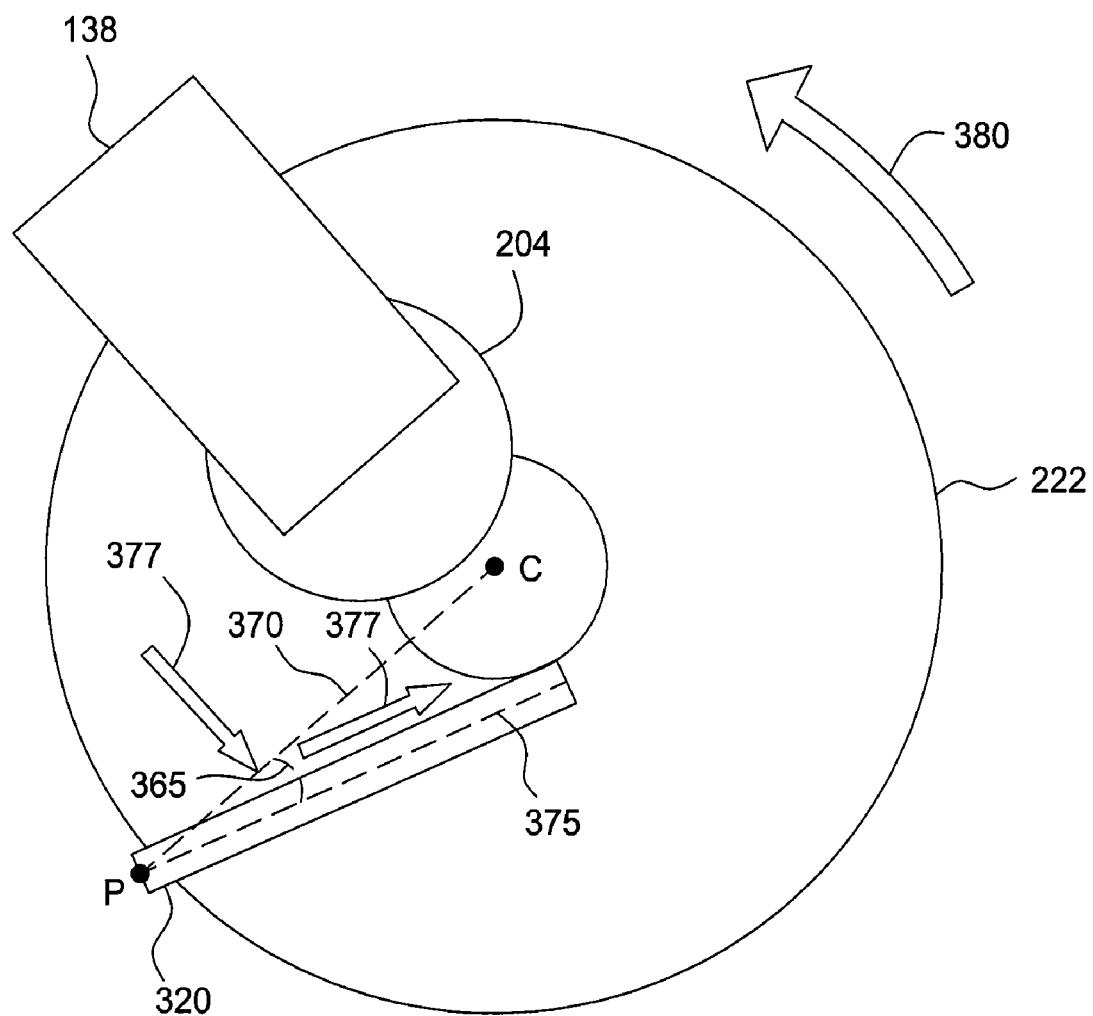
FIG. 3 is a simplified plan view of the ECMP station of FIG. 2.

FIG. 3 is a simplified plan view of the ECMP station of FIG. 2. The air knife 320 is mounted on the support structure 315 so that the air knife may be selectively rotated relative to the support structure and then locked into place. Alternatively, the support structure may be rotated relative to the base 108 and locked into place. Further, the height of the air knife 320 relative to the upper surface of the pad 222 may also be adjustable. Preferably, the air knife 320 is inclined at an angle 365 relative to a radial centerline 370 of the pad 222. Alternatively, the air knife 320 may be parallel to the line 375 (the angle 365 equal to zero). More preferably, the angle 365 is greater than zero and less than or equal to forty-five degrees. The point C marks the center of the pad 222. The point P marks the intersection of the radial centerline 370 and a line 375 which is normal to the stream of air that will be expelled from the air knife 420 (shown collinear with a longitudinal centerline of the air knife for convenience). Arrow 380 denotes the direction of rotation of the pad 222. Preferably, a first end (proximal to point P) of the air knife is located proximate to the edge of the pad 222 and the air knife extends an optimal longitudinal distance ranging from about one-fourth of the radius of the pad 222 (or the radius of the platen 230) to about equal to the radius of the pad 222 (or the radius of the platen 230).

As electrolyte impacts the stream of air delivered from the air knife 320 to the surface of the pad 222, the inclination angle 265 will bias or divert at least a portion of the fluid, preferably substantially all of the fluid, to travel a path 377 generally toward the center C of the pad. This bias will reverse the effect of the centrifugal acceleration imparted by the rotation of the pad. The overall effect is recirculation of the electrolyte from a region near the edge of the pad 222 toward the center C of the pad due to the air knife 320 and back from the center C of the pad toward a region near the edge of the pad due to centrifugal acceleration of the electrolyte. This recirculation provides a uniform distribution of the electrolyte over the surface of the pad 222.

The angle 365 of the air knife 320 may depend on several factors, i.e., the rotational velocity of the pad 222, the available pressure and flow rate of the air supply 305, the viscosity of the electrolyte, the density of the electrolyte, and the amount of electrolyte. The height of the air knife above the pad 222 will also vary with several factors, i.e., the specific configuration of the air knife and the available pressure and flow rate of the air supply 305. The length of the air knife may depend on several factors, i.e., the inclination angle 365, the height of the air knife 320 above the pad 222, and other factors. If the pad rotates clockwise, then the angle 365 will be inverted relative to the radial centerline 380.

A test was performed to gauge the performance of the air knife assembly 300. A platen assembly of a conventional ECMP configuration was operated at 30 RPM. The resulting current was low due to the fact that the pad surface was dry. The air knife assembly was activated and the platen assembly was operated at 40 RPM. The current was close to nominal and the pad surface was sufficiently wet.

Figure 4A:
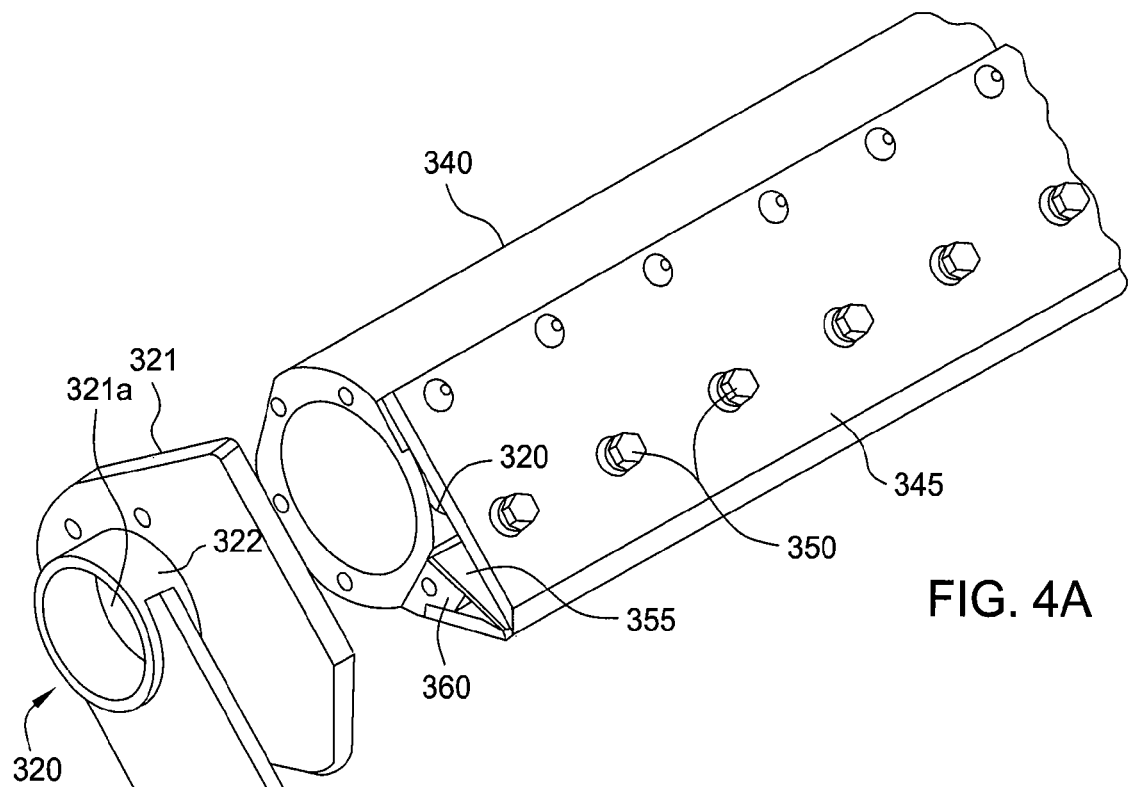
FIG. 4A is a perspective view illustrating the air knife of FIGS. 2 and 3.
Figure 4B:
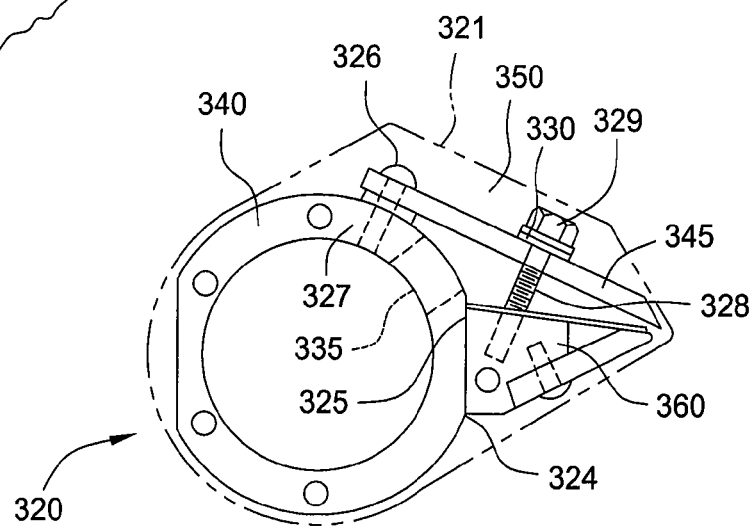
FIG. 4B is an end elevation view of the air knife of FIG. 4A.

FIGS. 4A and 4B illustrate the air knife 320 including an elongated plenum 340 having a longitudinal opening. A longitudinal support 360 is fixed on one side of the opening. A longitudinal flat plate forms a flexible baffle 355 extending on one side of the opening across the support forming one side of a longitudinal orifice opposite said opening. A longitudinal flexible blade 345 is fixed to the plenum 340 along the other side of the opening presenting a free edge portion opposite the baffle 355. Threaded fasteners 350 are spaced along the opening extending between the blade 345 and the support 360 for drawing the free edge portion of the blade 345 toward and away from said baffle 355 varying the size of the orifice permitting adjustment therealong.

FIG. 4A illustrates an elongated plenum 340 having an opening 335 therein extending longitudinally of the plenum 340. The plenum 340 has an end plate 321 illustrated in broken lines in FIGS. 4A and 4B. The end plate 321 has an opening 321a receiving an inlet pipe 322 carrying, a supply of air 305 under pressure thereto. A mounting bracket of the support structure 315 is carried upon the inlet pipe 322 for offering support of the air knife 320.

The elongated plenum 340 carries a longitudinal support 360 which is a substantially wedge shaped block suitably welded, as at 324 and 325, for acting as a support for the flat plate which forms the flexible baffle 355. The baffle 355 may be suitably secured as by gluing in position upon the support 360. The blade 345 is secured along one edge on the other side of the opening as by headed fasteners 326 substantially tangentially to the plenum 340, but upon a mounting strip 327 suitably secured to the plenum as by welding. The threaded fasteners 350 are provided to include a shank portion 328 which is threadably received on one end by the support 360 while another unthreaded portion passes through the blade 345 and carries a head 329 provided with a suitable lock washer 330.

Embodiments of the present invention include other air knife configurations than the one shown in FIGS. 4A and 4B. Embodiments of the present invention include application of the air knife to CMP systems and any system having a rotating flat surface with a liquid or foam disposed thereon.

While the foregoing is directed to embodiments of the present invention, other and further embodiments of the invention may be devised without departing from the basic scope thereof, and the scope thereof is determined by the claims that follow.

What is claimed is:

1. A method of processing a substrate, comprising:
providing a platen assembly, comprising a polishing pad disposed thereon and a fluid disposed on the polishing pad;
providing an air knife disposed over the pad;
rotating the platen assembly; and
operating the air knife to deliver a stream of air toward the polishing pad, to recirculate at least a portion of the fluid from a region near an edge of the polishing pad toward the center of the polishing pad.

2. The method of claim 1, further comprising disposing a substrate on the polishing pad, wherein the substrate is polished by the polishing pad.

3. The method of claim 1, wherein delivering the stream of air from the air knife comprises delivering the stream of air towards the polishing pad at a high velocity from an elongated plenum having a longitudinal opening.

4. The method of claim 3, wherein a length of the stream of air from the air knife ranges from about one-fourth of a radius of the polishing pad to about equal to the radius of the polishing pad.

5. The method of claim 4, wherein:
a first end of the stream of air from the air knife is delivered proximate an edge of the polishing pad,
a longitudinal axis of the stream of air from the air knife extends from the edge and toward the center of the polishing pad, and
the longitudinal axis of the stream of air from the air knife is inclined relative to a radial centerline of the polishing pad by an angle.

6. The method of claim 5, wherein the angle is greater than zero and less than or equal to forty-five degrees.

7. The method of claim 6, further comprising adjusting the angle according to one or more of a rotational rate of the polishing pad, the viscosity of the polishing fluid, the density of the polishing fluid, the amount of the polishing fluid on the polishing pad, and a pressure or a flow rate of an air supply connected to the elongated plenum.

8. The method of claim 7, further comprising adjusting a height of the air knife above the polishing pad according to the pressure and flow rate of the air supply.

9. The method of claim 1, wherein the polishing pad is made from an electrically conductive material and the fluid is an electrolyte.

10. The method of claim 9, further comprising disposing a substrate on the polishing pad and establishing an electrical potential between the substrate and the polishing pad, wherein the substrate is polished by the polishing pad and the electrical potential.

11. The method of claim 1, wherein the stream of air recirculates substantially all of the fluid from the region near the edge of the polishing pad toward the center of the polishing pad.

12. The method of claim 1, wherein the stream of air serves as a barrier to the fluid on the polishing pad against centrifugal acceleration due to the rotation of the polishing pad.

13. A method of processing a substrate, comprising:
rotating a platen assembly having a polishing pad disposed thereon;
dispensing a polishing fluid onto the polishing pad; and
directing a stream of air toward the polishing pad to recirculate at least a portion of the fluid from an edge region of the polishing pad toward the center of the pad.

14. The method of claim 13 further comprising:
pressing a substrate against the rotating polishing pad in the presence of the polishing fluid.

15. The method of claim 13 further comprising:
establishing an electrical potential through the polishing fluid between the substrate and the polishing pad, wherein the substrate is polished by the polishing pad and the electrical potential.

16. The method of claim 13, wherein the stream of air servers as barrier to the polishing fluid on the polishing pad against centrifugal acceleration due to the rotation of the polishing pad.

17. The method of claim 16, wherein directing the stream of air comprises delivering the stream of air towards the polishing pad at a high velocity from an elongated plenum having an opening extending longitudinally of the elongated plenum.

18. The method of claim 17, wherein the stream of air ranges from about one-fourth of a radius of the polishing pad to about equal to the radius of the polishing pad.

19. The method of claim 18, further comprising adjusting an angle between a longitudinal axis of the stream of air and a radial centerline of the polishing pad according to one or more of a rotational rate of the polishing pad, the viscosity of the polishing fluid, the density of the polishing fluid, the amount of the polishing fluid on the polishing pad, and a pressure or a flow rate of an air supply connected to the elongated plenum.

20. The method of claim 19, wherein the angle is greater than zero and less than or equal to forty-five degrees.

* * * * *